(12) United States Patent
Oda et al.

(10) Patent No.: US 9,621,076 B2
(45) Date of Patent: Apr. 11, 2017

(54) VIBRATION TYPE DRIVING DEVICE

(71) Applicant: CANON KABUSHIKI KAISHA, Tokyo (JP)

(72) Inventors: Yuki Oda, Yokohama (JP); Masanori Takahashi, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 316 days.

(21) Appl. No.: 14/249,130

(22) Filed: Apr. 9, 2014

(65) Prior Publication Data

US 2014/0306578 A1 Oct. 16, 2014

(30) Foreign Application Priority Data

Apr. 12, 2013 (JP) .................................. 2013-083537
Feb. 21, 2014 (JP) .................................. 2014-032213

(51) Int. Cl.
*H02N 2/16* (2006.01)
*H02N 2/00* (2006.01)

(52) U.S. Cl.
CPC ............. *H02N 2/163* (2013.01); *H02N 2/009* (2013.01)

(58) Field of Classification Search
CPC  H02N 2/10; H02N 2/103; H02N 2/12; H02N 2/16; H02N 2/163
USPC ........................................ 310/323.01–323.21
See application file for complete search history.

(56) References Cited

U.S. PATENT DOCUMENTS 6,140,741 A * 10/2000 Tamai ................... H02N 2/163
310/323.01

FOREIGN PATENT DOCUMENTS

| JP | 7-135783 | A | 5/1995 |
| JP | 8-2186 | B2 | 1/1996 |
| JP | 9-98586 | A | 4/1997 |
| JP | 2009-142142 | A | 6/2009 |
| JP | 2011-176067 | A | 9/2011 |

* cited by examiner

*Primary Examiner* — Derek Rosenau
(74) *Attorney, Agent, or Firm* — Canon USA, Inc. IP Division

(57) ABSTRACT

A vibration type driving device includes an electro-mechanical energy conversion element; a vibrator fixed to the electro-mechanical energy conversion element and configured to be vibrated by application of voltage to the electro-mechanical energy conversion element; a first driven member and a second driven member frictionally driven by press-contact with the vibrator and configured to transmit rotational forces by frictional driving to an output shaft; and at least one pressing portion configured to bring the first driven member and the second driven member into press contact with the vibrator, wherein the pressing portion, the first driven member, the second driven member, and the vibrator are arranged to allow an air flow generated by an airflow generation unit to flow through an air-ventilation path of the pressing portion, between the first driven member and the second driven member, and an air-ventilation path of the vibrator.

14 Claims, 11 Drawing Sheets

VIBRATION TYPE DRIVING DEVICE

BACKGROUND OF THE INVENTION

Field of the Invention

This disclosure relates to a vibration type driving device including a vibrator and a driven member and configured to drive the driven member and, more specifically, to a cooling unit of a vibration type driving device.

Description of the Related Art

In the related art, there is a known vibration type driving device configured to drive a movable body (driven member) by vibrations generated by a vibrator. The vibrator generally includes an elastic member and a piezoelectric device, which corresponds to an electro-mechanical energy conversion element arranged on the elastic member.

The driven member that is in press-contact with the vibrator is driven by a traveling wave, which is generated by exciting the vibrator with two standing waves having phases positionally shifted from each other at temporally shifted phases.

The vibration type driving device is demanded to be reduced in size and have high-power. However, in that case, a countermeasure for heat generation and a temperature increase is important.

In other words, a loss of input power of the vibration type driving device, which is not output therefrom, is considered to be changed to heat.

However, when demanding a reduction in size and high-power, an amount of power loss per volume and an amount of power loss per surface area increase.

Such dissipated power causes deterioration in function of the components of the vibration type driving device, and causes a temperature rise as much as it affects the performance of the vibration type driving device, whereby such a phenomenon that components are subjected to acceleration of abrasion occurs. Therefore, it is necessary to prepare a countermeasure such as a cooling unit.

Examples of the cooling unit as described above include a structure having a fan-shaped pressing spring, which brings the vibrator and the driven member into press-contact with each other, to generate an air flow at the time of driving as disclosed in Japanese Patent Laid-Open No. 9-098586.

However, with the configuration in which the shape of the pressing spring of the related art is partly modified into the fan structure does not necessarily achieve a satisfactory result of cooling the vibration type driving device against the reduction in size and high-power, and still has a problem of difficulty in sufficient cooling.

As regards the high-power required for the vibration type driving device, a configuration using a plurality of driven members as illustrated in FIG. 11 is conceivable.

In FIG. 11, driven members 103a and 103b are in contact with a vibrator 101. Therefore, when the driven members 103a and 103b are connected with a common output shaft 106, outputs generated by the plurality of driven members may be obtained from the single output shaft. Consequently, a high-power configuration is achieved.

However, when such a configuration is employed in the disclosed configuration, an air flow generated by a pressing spring fan 117 flows as indicated by an arrow 18 illustrated in FIG. 11, and hence only the driven member on the inner side is cooled. Therefore, sufficient cooling of the entire vibration type driving device is not achieved easily.

SUMMARY OF THE INVENTION

An aspect of this disclosure relates to a vibration type driving device provided with a cooling unit which achieves a further improved cooling effect in comparison with that of the related art.

A vibration type driving device includes: an electro-mechanical energy conversion element; a vibrator fixed to the electro-mechanical energy conversion element and configured to be vibrated by application of voltage to the electro-mechanical energy conversion element; a first driven member and a second driven member frictionally driven by press-contact with the vibrator and configured to transmit rotational forces by frictional driving to an output shaft; and at least one pressing portion configured to bring the first driven member and the second driven member into press contact with the vibrator, wherein the pressing portion, the first driven member, the second driven member, and the vibrator are arranged to allow an air flow generated by an airflow generation unit to flow through an air-ventilation path of the pressing portion, between the first driven member and the second driven member, and an air-ventilation path of the vibrator.

Further features of the present invention will become apparent from the following description of exemplary embodiments with reference to the attached drawings.

DESCRIPTION OF THE EMBODIMENTS

A vibration type driving device of an embodiment of this disclosure will be described.

The vibration type driving device of the embodiment disclosed here includes an air-ventilation path for cooling a plurality of driven members, and the air-ventilation path is configured to allow an air flow generated by an airflow generation unit to flow through a pressing portion, between the plurality of driven members, and a vibrator.

Therefore, the air flow generated by the airflow generation unit flows to come into contact with the plurality of driven members through the air-ventilation path.

This air flow allows the plurality of driven members to be cooled simultaneously, so that temperatures of the plurality of driven members may be maintained to be constant.

Therefore, driving characteristics of the vibration type driving device is maintained to be constant, so that an occurrence of difference in durability among the plurality of driven members may be avoided.

EXAMPLES

Examples of this disclosure will be described below.

Example 1

Figure 1:
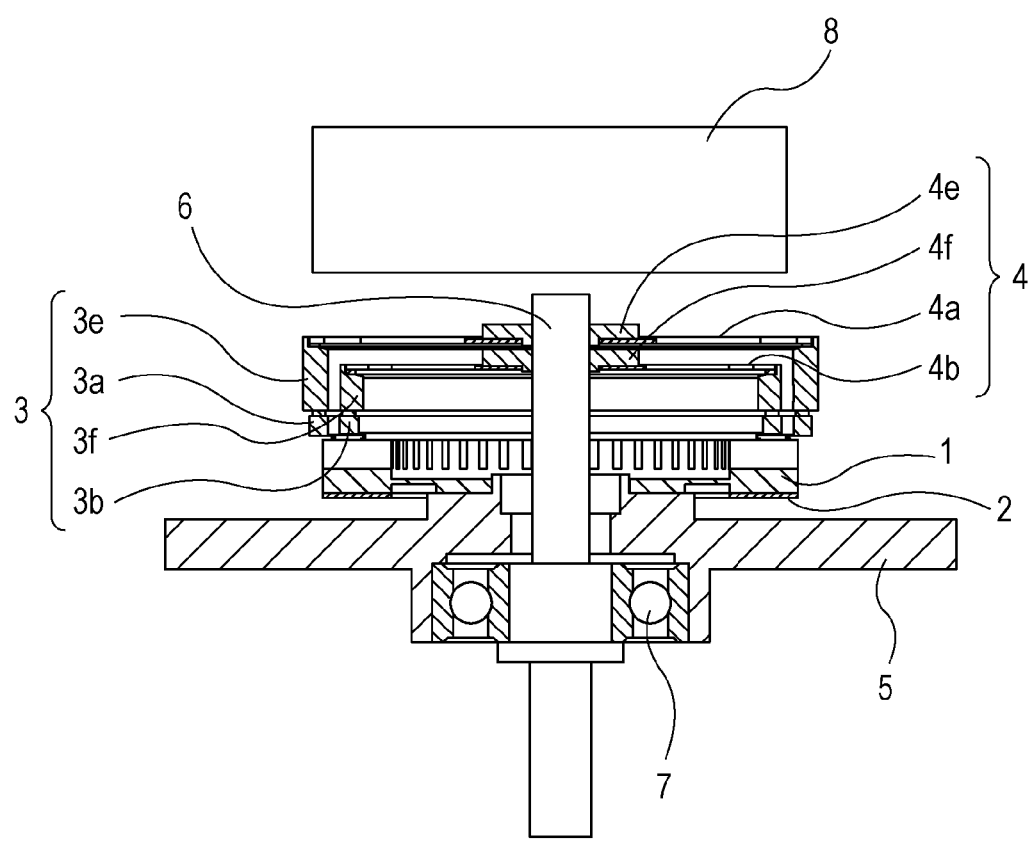
FIG. 1 illustrates a configuration of a vibration type driving device.

In Example 1, an example of a configuration of an ultrasonic motor will be described as an example of the vibration type driving device to which this disclosure is applied with reference to FIG. 1.

The vibration type driving device of this example includes an electro-mechanical energy conversion element, a vibrator fixed to the electro-mechanical energy conversion element and configured to be vibrated by an application of a voltage to the electro-mechanical energy conversion element, the plurality of driven members configured to be driven by a friction caused by press-contact with the vibrator and to transmit rotational forces generated by the frictional driving to an output shaft, and at least one pressing portion configured to bring the plurality of driven members into the press contact with the vibrator. Specifically, the vibration type driving device includes a vibrator 1, a piezoelectric device 2 serving as an electro-mechanical energy conversion element, a driven member 3, a pressing portion 4, a vibrator supporting portion 5, an output shaft 6, and a ball bearing 7, and is formed into a ring shape as illustrated in FIG. 1.

The vibration type driving device may include an airflow generation unit 8. Two AC voltages having a predetermined phase difference are applied to the piezoelectric device 2 joined to the vibrator 1 to cause a vibration element including the vibrator 1 and the piezoelectric device 2 to excite a traveling vibrating wave.

With this vibrating wave, a wobbling motion along an elliptical trajectory occurs on an upper surface of a projection part of the vibrator 1.

With this wobbling motion, the driven member 3 which is brought into press contact with the vibrator 1 by the pressing portion 4 is driven while rotating about the output shaft 6 relatively with respect to the vibrator 1.

Examples of the airflow generation unit 8 include a fan configured to feed wind to the vibration type driving device from the outside of the vibration type driving device.

In the same manner, a fan configured to generate wind proceeding from the vibrator to the pressing portion by inhaling air inside the vibration type driving device may be used as the airflow generation unit 8. Alternatively, the same advantages are achieved by applying a positive pressure or a negative pressure to the inside of the vibration type driving device.

Figure 2:
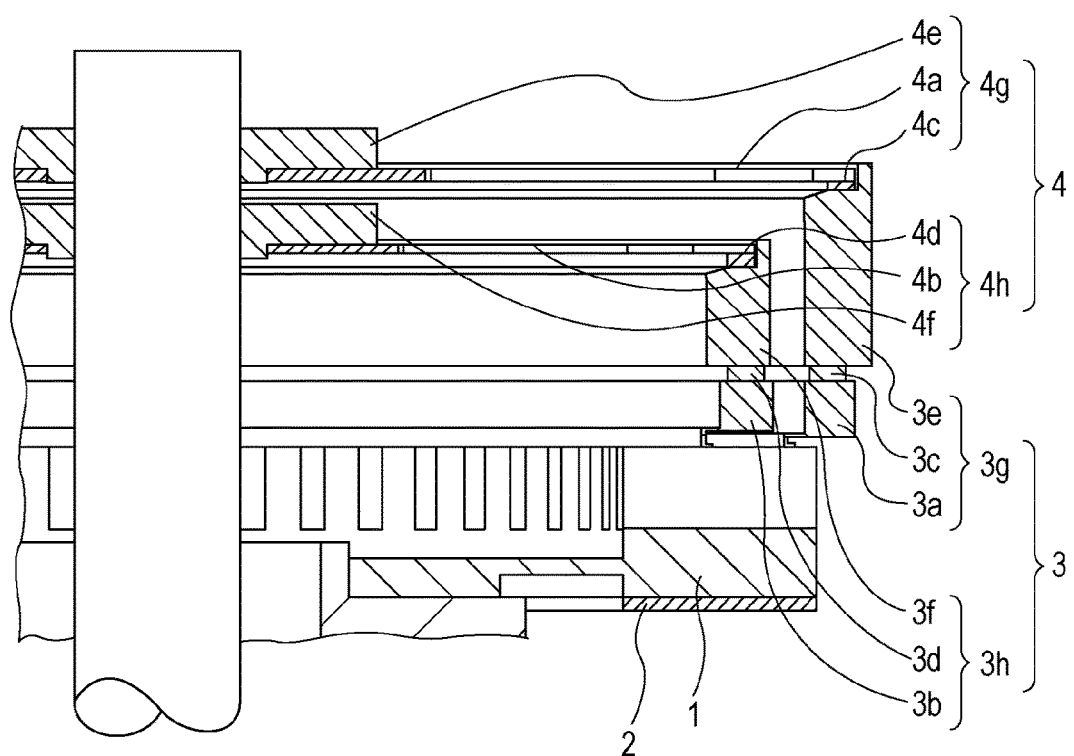
FIG. 2 illustrates configurations of a vibrator and a driven member of the vibration type driving device.

FIG. 2 illustrates the vibration element and the driven member of the vibration type driving device of this example in an enlarged scale.

The driven member 3 is formed into a ring shape, and includes two driven members. The driven member 3 includes a first body portion 3a, a second body portion 3b, a first body receiving rubber 3c, a second body receiving rubber 3d, a first pressure receiving portion 3e, and a second pressure receiving portion 3f.

In other words, the driven member 3 includes a first driven member 3g composed of the first body portion 3a, the first body receiving rubber 3c, and the first pressure receiving portion 3e, and a second driven member 3h composed of the second body portion 3b, the second body receiving rubber 3d, and the second pressure receiving portion 3f.

Furthermore, a gap is provided between the first driven member 3g and the second driven member 3h.

The pressing portion 4 is mounted on upper surfaces of the first pressure receiving portion 3e and the second pressure receiving portion 3f, and the pressing portion 4 includes a first pressing portion 4g composed of a first pressing spring 4a, a first pressing spring rubber 4c, and a first disc 4e, and a second pressing portion 4h composed of a second pressing spring 4b, a second pressing spring rubber 4d, and a second disc 4f.

The first pressing portion 4g brings the first driven member 3g into press contact with the vibrator 1, and the second pressing portion 4h brings the second driven member 3h into press contact with the vibrator 1.

In the first pressing portion 4g, an inner periphery of the first pressing spring 4a is mounted on the first disc 4e that is fitted to the output shaft 6, so that a driving force of the first driven member 3g is transmitted to the output shaft 6.

In the same manner, in the second pressing portion 4h, an inner periphery of the second pressing spring 4b is mounted on the second disc 4f that is fitted to the output shaft 6, so that a driving force of the second driven member 3h is transmitted to the output shaft 6.

Driving with the driving force of the first driven member 3g and the driving force of the second driven member 3h combined with each other allows an achievement of a reduction in size and high-power.

Figure 3:
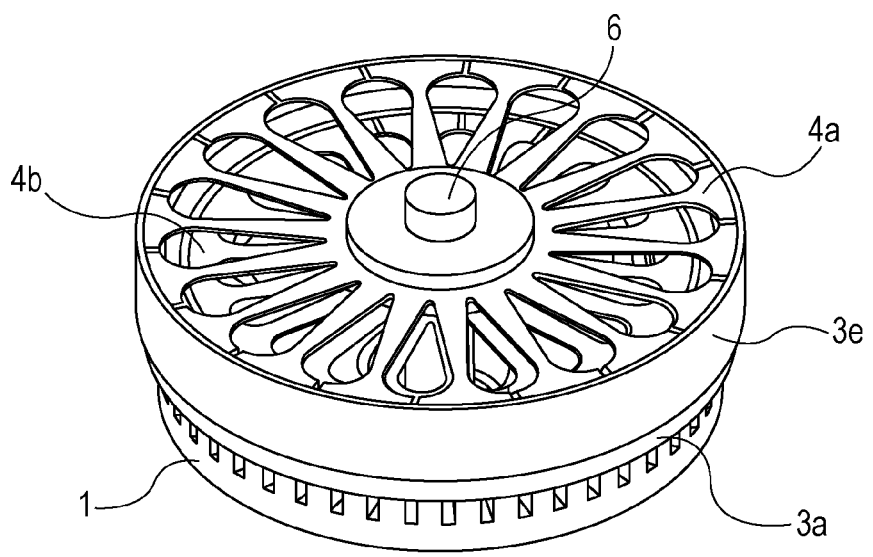
FIG. 3 is a perspective view of the vibration type driving device illustrating a shape of a spring.
Figure 4:
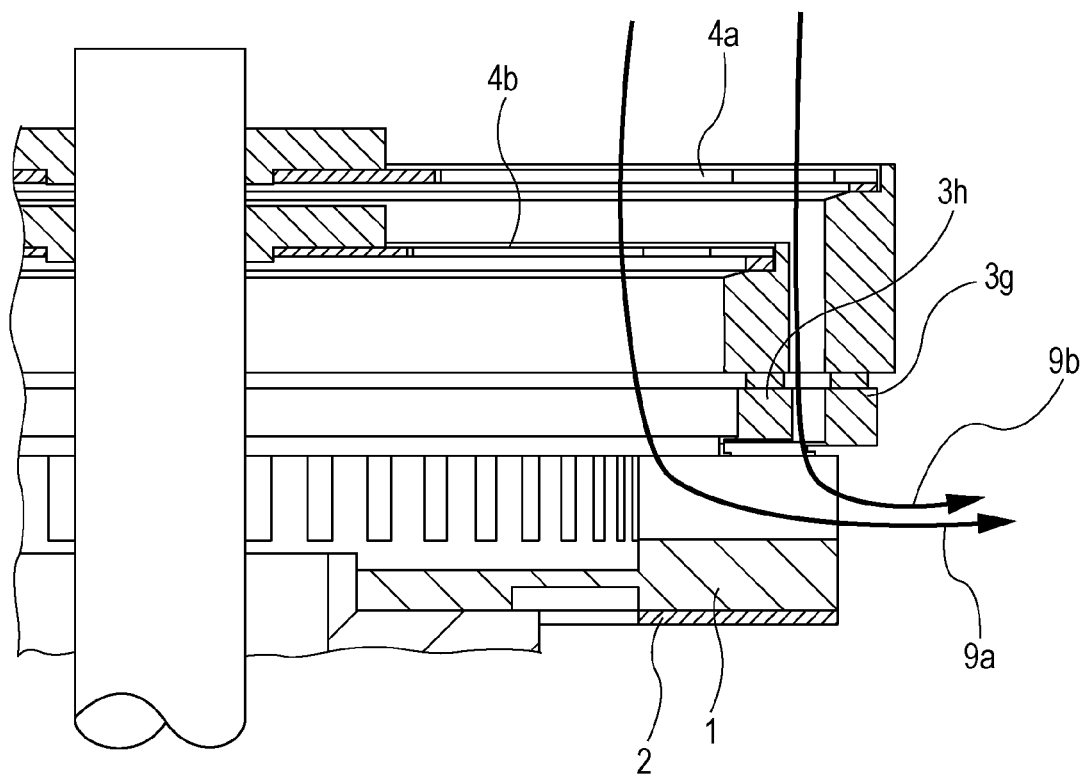
FIG. 4 illustrates an air flow in the vibration type driving device.

In addition, the first and the second pressing spring 4a and 4b are provided with openings as illustrated in FIG. 3 to form an air-ventilation path between the inside and the outside of the vibration type driving device. In other words, the pressing portion 4 includes openings which form the air-ventilation path.

The vibrator 1 is provided with a plurality of grooves extending in the radial direction, which also serve as the air-ventilation path in the radial direction between the inside and the outside of the vibration type driving device. In other words, the air-ventilation path of the vibrator 1 includes the plurality of grooves.

In this configuration, the air is allowed to flow between one of the driven members and the other driven member of the plurality of driven members.

Specifically, the air flow generated by the airflow generation unit (wind generating unit) 8 is allowed to flow the inner periphery side (arrow 9a) of the second driven member 3h, and between the first driven member 3g and the second driven member 3h (arrow 9b).

At this time, when the fan is used as the airflow generation unit 8, portions near the first driven member 3g and the second driven member 3h and near the first pressing spring 4a and the second pressing spring 4b, where the air flow of the fan is strong, may be used. Therefore, the plurality of driven members which are positioned near a contact portion and hence are liable to become heat generating sources may be cooled evenly. In this case, the fan is configured to feed air to the air-ventilation path of the pressing portion.

The pressing portion 4, the first driven member 3g, the second driven member 3h, and the vibrator 1 are arranged to allow the air flow generated by the airflow generation unit 8 to flow through the air-ventilation path of the pressing portion 4, between the first driven member 3g and the second driven member 3h, and the air-ventilation path of the vibrator 1.

A configuration in which the fan is mounted in the reverse direction to generate wind on the outside of the vibrator to invert the direction indicated by the arrow is also applicable. In other words, the fan may be configured to suck the air into the air-ventilation path of the pressing portion. At this time, since cooling is started from the portion near the vibrator which seems to have a high temperature, the cooling effect is expected to be further enhanced.

In this example, the openings provided in the pressing spring may have a shape larger at the outside portion of the pressing portion than the inner side portion thereof. For example, the openings may have a teardrop shape which is widened as it goes outward as illustrated in FIG. 3. The shape of the openings may have any shape, not only an elongated circular shape, or a circular shape, but also an arcuate shape or a square or polygonal shape as long as an air-ventilation port in the axial direction may be secured.

Example 2

An example of the vibration type driving device having a different mode from Example 1 will be described as Example 2 with reference to FIGS. 5A and 5B.

Figure 5A:
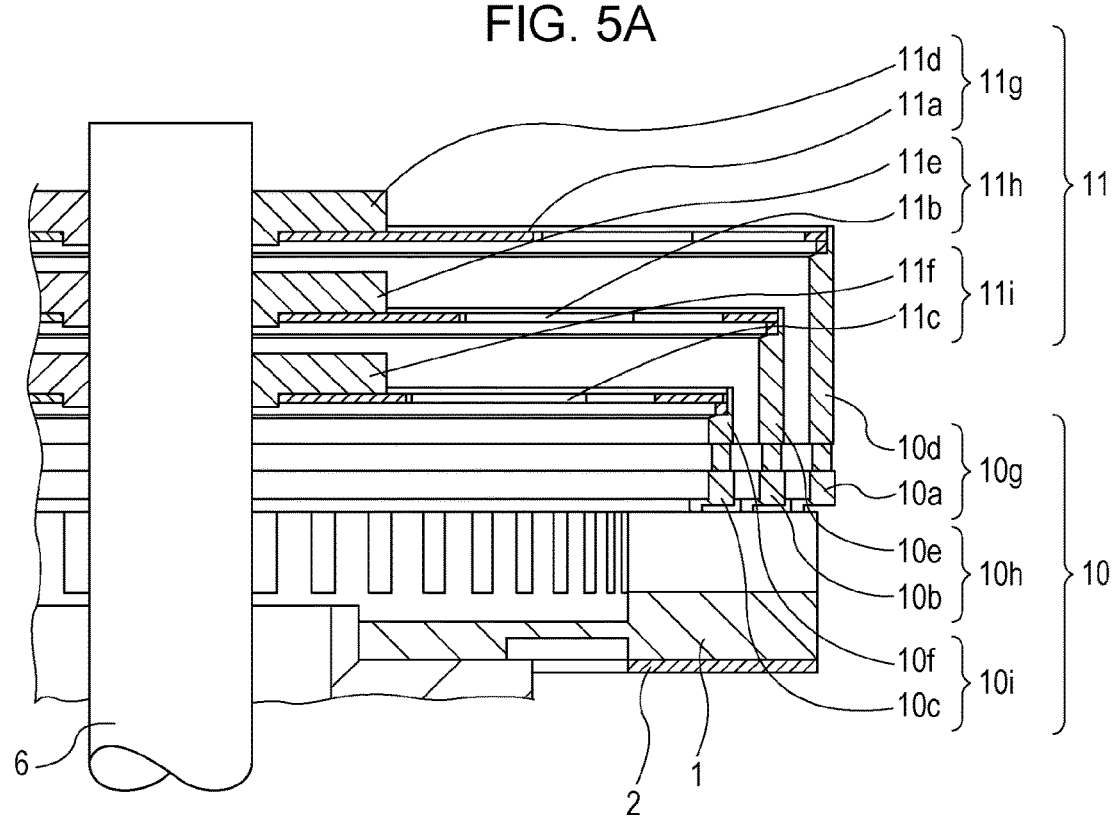
FIG. 5A is an explanatory drawing of the vibration type driving device illustrating configurations of the vibrator and the driven member.
Figure 5B:
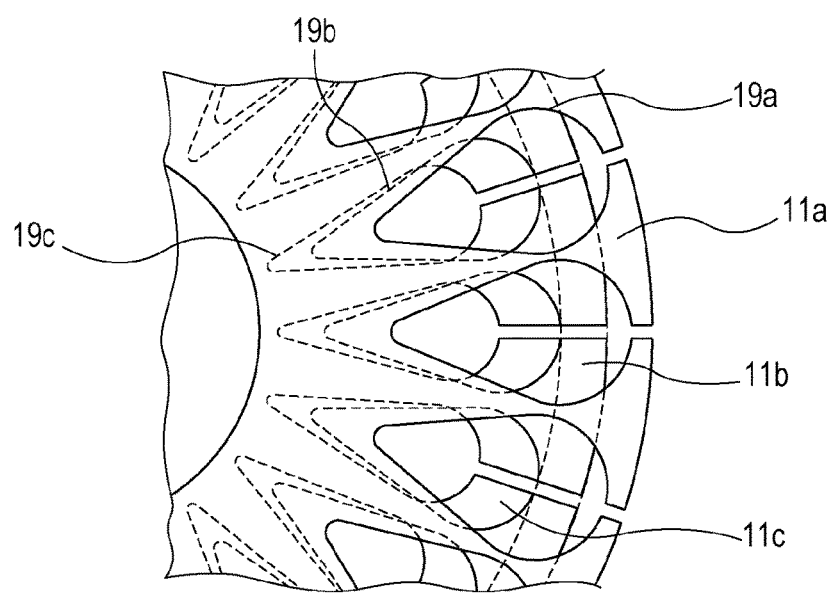
FIG. 5B is an explanatory drawing of the vibration type driving device illustrating a structure of a pressing portion.

The vibration type driving device of this example includes the vibrator 1, the piezoelectric device 2 serving as the electro-mechanical energy conversion element, a driven member 10, a pressing portion 11, and the output shaft 6, and is formed into a ring shape as illustrated in FIGS. 5A and 5B. The configurations of the vibrator supporting portion and the output shaft are the same as those of Example 1.

In this manner, even though there are three or more vibrators, the same advantages as in Example 1 will be obtained.

The pressing portion 11 includes a first pressing portion 11g including a first pressing spring 11a and a first disc 11d, a second pressing portion 11h including a second pressing spring 11b and a second disc 11e, and a third pressing portion 11i including a third pressing spring 11c and a third disc 11f.

The driven member 10 includes a first driven member 10g including a first body portion 10a and a first pressure receiving portion 10d, a second driven member 10h including a second body portion 10b and a second pressure receiving portion 10e, and a third driven member 10i including a third body portion 10c and a third pressure receiving portion 10f.

Gaps are provided between the first driven member 10g and the second driven member 10h, and between the second driven member 10h and the third driven member 10i, respectively.

The first pressing spring 11a presses the first driven member 10g at the radially outermost position, the second pressing spring 11b presses the second driven member 10h positioned in the middle, and the third pressing spring 11c presses the third driven member 10i at the radially innermost position.

At this time, as illustrated in FIG. 5B, first openings 19a provided in the first pressing portion 11g are provided on the radially outside with respect to second openings 19b provided in the second pressing spring 11h, and the second openings 19b are provided on the radially outside with respect to third openings 19c provided in the third pressing spring 11c.

Figure 6:
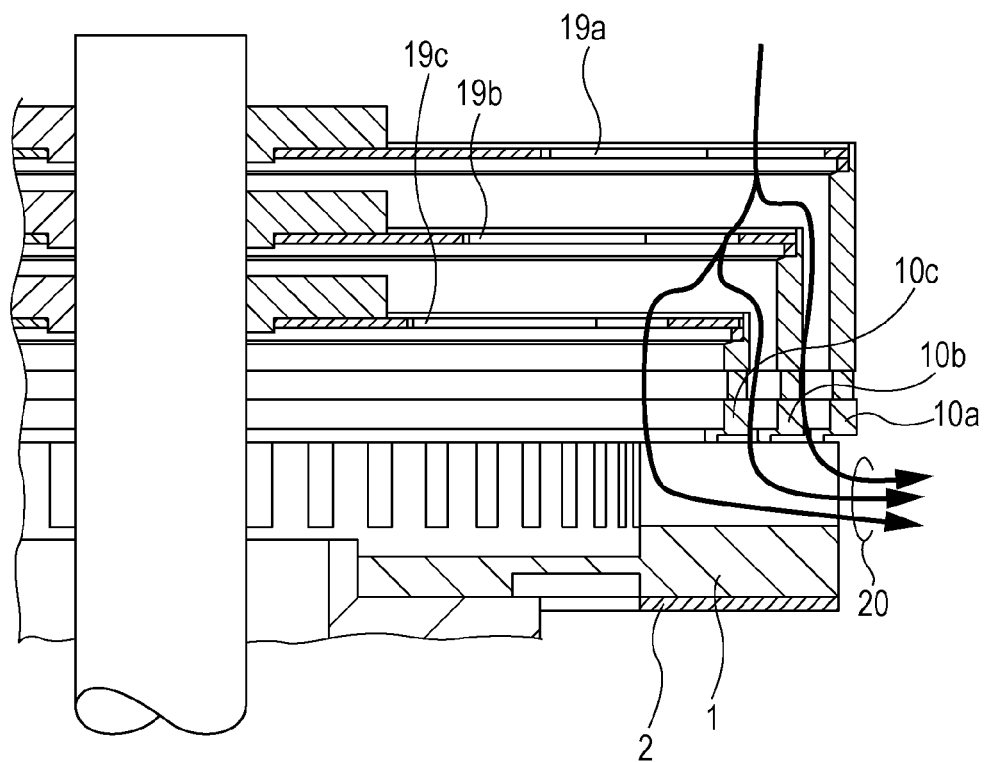
FIG. 6 illustrates the air flow in the vibration type driving device.

In this manner, by shifting the positions of the openings so that the openings of the pressing spring configured to press the driven member positioned on the radially outer side to be positioned on the radially outer side, wind is branched in the vicinities of the radially outside of the openings of the respective pressing springs as indicated by arrows 20 in FIG. 6, whereby the respective driven members are brought into contact with the air flow efficiently. In other words, the pressing portion 11, the first driven member 10g, the second driven member 10h, the third driven member 10i, and the vibrator 1 are arranged to allow the air flow generated by the airflow generation unit 8 to flow through an air-ventilation path of the pressing portion 11, between the first driven member 10g and the second driven member 10h, between the second driven member 10h and the third driven member 10i, and the air-ventilation path of the vibrator 1.

In this configuration, the high-power than the configuration of Example 1 may be expected. Moreover, the cooling efficiency may be enhanced.

In this example, the number of the vibrators is three. However, four or more vibrators may be provided. The enhancement of the cooling efficiency is achieved even though the number of the vibrators is two as long as the same configuration is employed.

Example 3

An example of the configuration of the vibration type driving device having a different mode from Examples 1 and 2 will be described as Example 3 with reference to FIG. 7.

Figure 7:
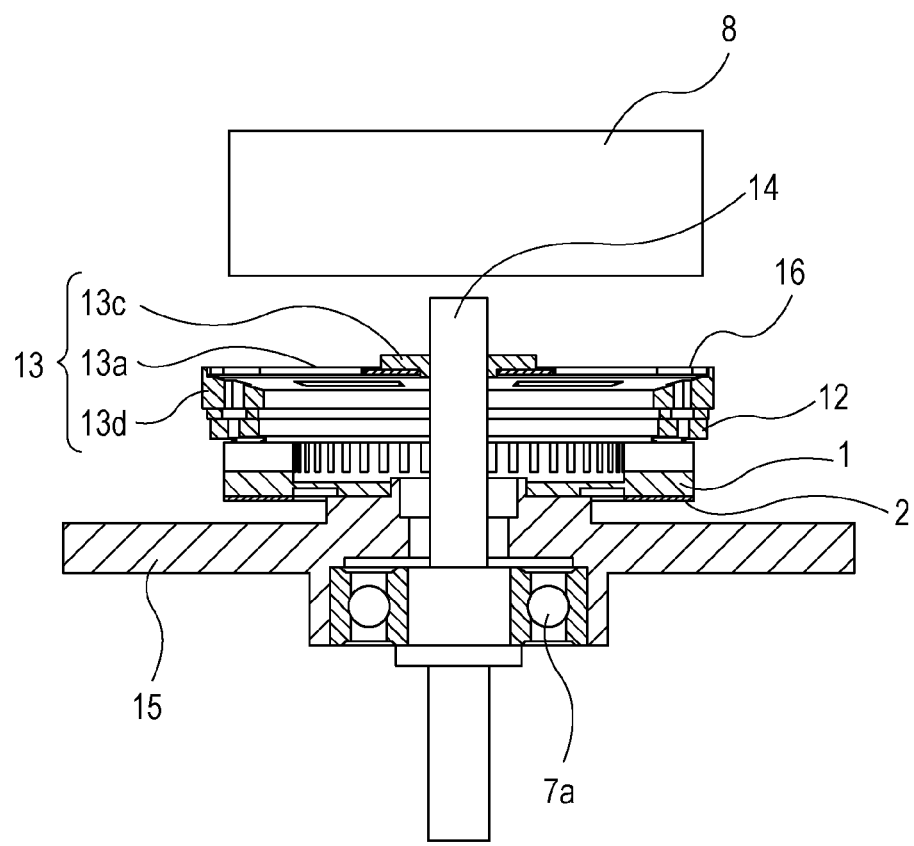
FIG. 7 illustrates the configuration of the vibration type driving device.

The vibration type driving device of this example includes the vibrator 1, the piezoelectric device 2 serving as the electro-mechanical energy conversion element, a driven member 12, a pressing portion 13, an output shaft 14, a vibrator supporting portion 15, the ball bearing 7, and the airflow generation unit 8, and is formed into a ring shape as illustrated in FIG. 7.

Figure 8:
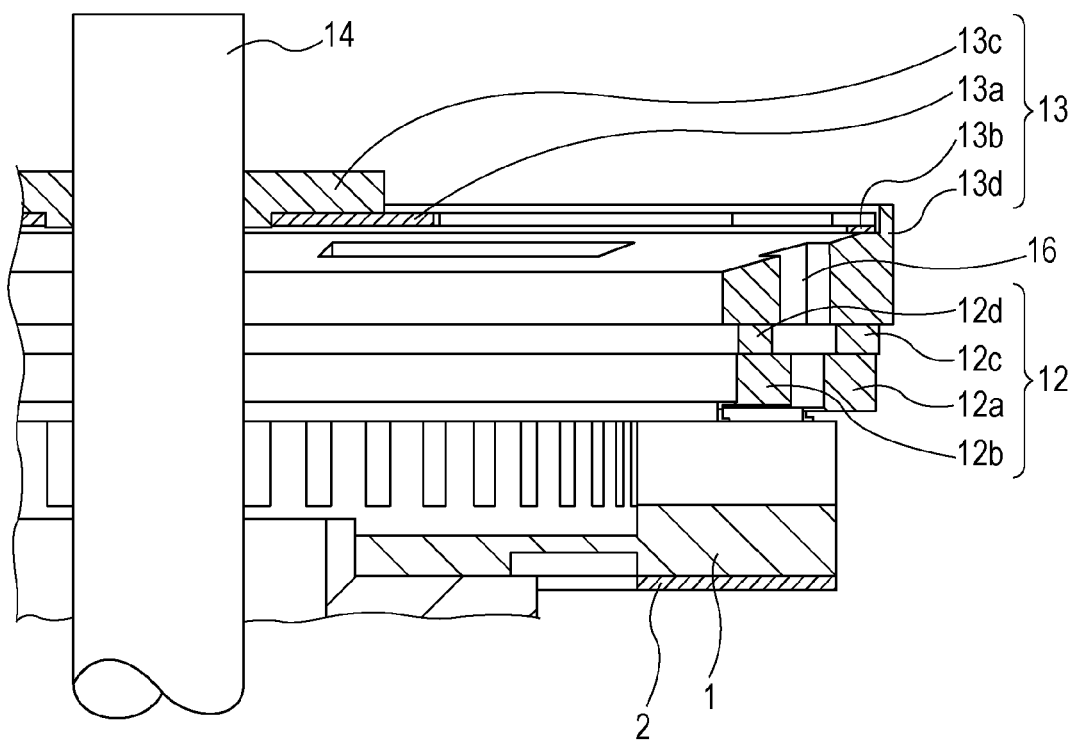
FIG. 8 illustrates the configurations of the vibrator and the driven member of the vibration type driving device.

FIG. 8 illustrates the vibration element and the driven member of the vibration type driving device of this example in an enlarged scale.

The driven member 12 is formed into a ring shape, and includes two driven members and one pressure receiving portion.

In other words, the driven member 12 includes a first body portion 12a, a second body portion 12b, a first body receiving rubber 12c, and a second body receiving rubber 12d.

The pressing portion 13 is mounted on upper surfaces of the first body receiving rubber 12c and the second body receiving rubber 12d, and the pressing portion 13 includes a pressing spring 13a, a pressing spring rubber 13b, a disc 13c, and a pressure receiving portion 13d.

The pressure receiving portion 13d is provided with openings 16. An inner periphery of the pressing spring 13a is mounted on the disc 13c fitted on the output shaft 14, so that a driving force of the driven member 12 is transmitted to the output shaft 14.

Figure 9:
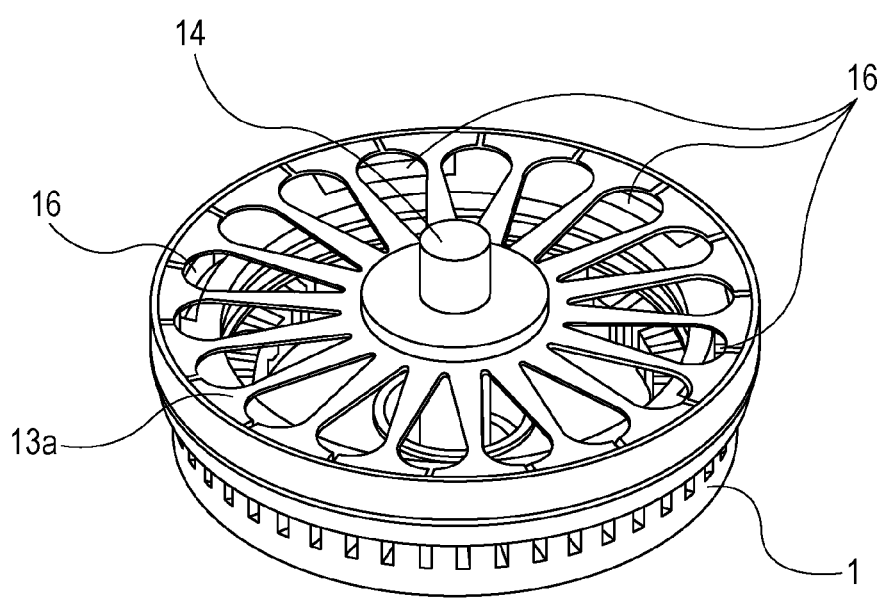
FIG. 9 is a perspective view of the vibration type driving device illustrating the shape of the spring and positions of hole.

As illustrated in FIG. 9, teardrop-shaped holes are provided in the pressing spring 13a. However, the holes may have any given shape as in Example 1.

In this example, a plurality of arcuate-shaped holes are provided as the openings 16. However, the holes may have any given shape such as circular holes or elongated circular holes.

In this configuration as well, driving with a driving force of the first body portion 12a and the driving force of the second body portion 12b combined with each other allows an achievement of a reduction in size and high-power.

A configuration having less thickness and size in comparison with Example 1 is achieved.

The pressing spring 13a is provided with openings being the same as in Example 1 to form air-ventilation paths between the inside and the outside of the vibration type driving device in the axial direction.

The vibrator 1 is provided with a plurality of grooves extending in the radial direction, which also serve as the air-ventilation paths in the radial direction between the inside and the outside of the vibration type driving device.

Figure 10:
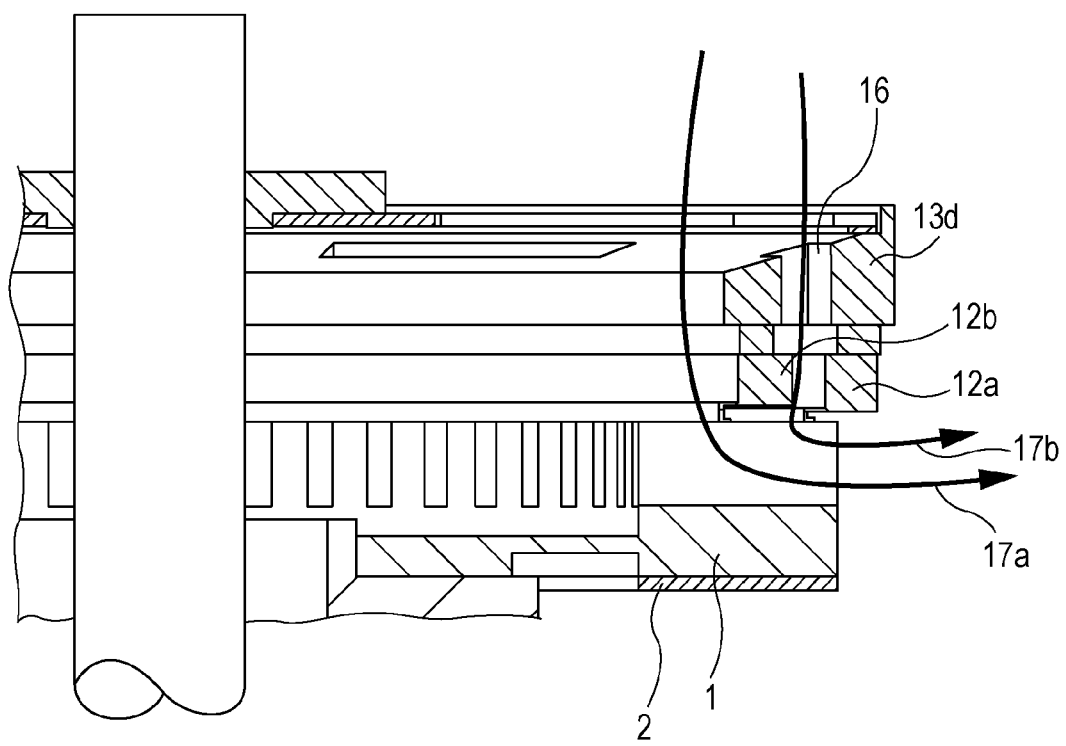
FIG. 10 illustrates the air flow in the vibration type driving device.
Figure 11:
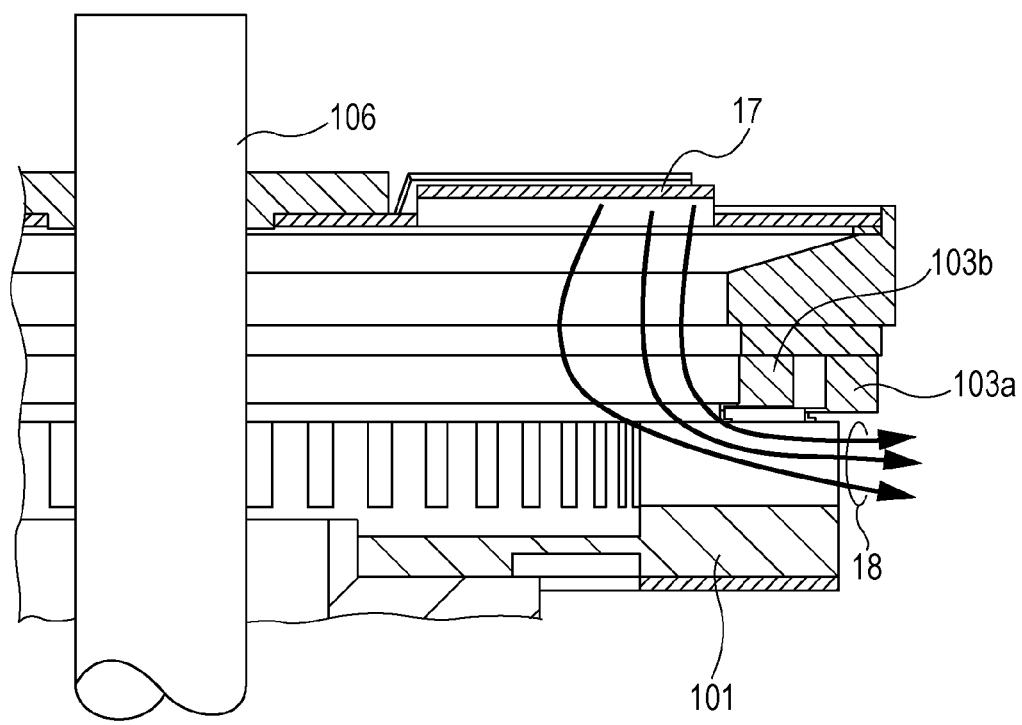
FIG. 11 illustrates the air flow in the vibration type driving device.

In this configuration, the air flow generated by the airflow generation unit 8 may be divided into an air flow flowing through the inner periphery side of the second body portion 12b (an arrow 17a) and an air flow passing through the openings 16 and between the first body portion 12a and the second body portion 12b (an arrow 17b) as illustrated in FIG. 10.

The direction of generation of the air flow may be inverted to invert the direction of the arrows.

In this example as well, three or more body portions may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-083537, filed Apr. 12, 2013 and Japanese Patent Application No. 2014-032213, filed Feb. 21, 2014, which are hereby incorporated by reference herein in their entirety.

What is claimed is:

1. A vibration type driving device comprising:
an electro-mechanical energy conversion element;
a vibrator fixed to the electro-mechanical energy conversion element;
a first driven member and a second driven member arranged concentrically and are in contact with the vibrator, each being configured to transmit rotational forces to an output shaft; and
a pressing portion configured to bring the first driven member and the second driven member into press contact with the vibrator, wherein
the pressing portion, the first driven member, the second driven member, and the vibrator are arranged to allow an air flow generated by an airflow generation unit to flow through an air-ventilation path of the pressing portion, between the first driven member and the second driven member, and an air-ventilation path of the vibrator.

2. The vibration type driving device according to claim 1, wherein the air-ventilation path of the vibrator is configured to connect an inside and an outside of the vibration type driving device.

3. The vibration type driving device according to claim 1, wherein the first driven member and the second driven member each include a contact portion to be brought into press contact with the vibrator, and
the first driven member and the second driven member are arranged to allow an air passing through the air-ventilation path of the vibrator to flow between the contact portion of the first driven member and the contact portion of the second driven member.

4. The vibration type driving device according to claim 1, wherein the air-ventilation path of the vibrator includes a plurality of grooves provided in a portion which faces to the first and second driven members.

5. The vibration type driving device according to claim 1, wherein the airflow generation unit is a unit configured to generate an air flow flowing along the air-ventilation path.

6. The vibration type driving device according to claim 1, wherein the airflow generation unit is configured to generate an air flow on the outside of the pressing portion.

7. The vibration type driving device according to claim 1, wherein the airflow generation unit is configured to generate an air flow on an outside of the vibrator.

8. The vibration type driving device according to claim 1, wherein the airflow generation unit is a fan.

9. The vibration type driving device according to claim 8, wherein the fan is configured to feed air to the air-ventilation path of the pressing portion.

10. The vibration type driving device according to claim 8, wherein the fan is configured to suck air to the air-ventilation path of the pressing portion.

11. The vibration type driving device according to claim 1, wherein the air-ventilation path of the pressing portion includes an opening provided in the pressing portion.

12. The vibration type driving device according to claim 11, wherein a shape of the opening is one of a teardrop shape, an elongated circular shape, a circular shape, an arcuate shape, and a square shape.

13. The vibration type driving device according to claim 1, wherein the air-ventilation path of the pressing portion includes an opening the sides of which is larger outside than the size inside.

14. The vibration type driving device according to claim 1, further comprising a third driven member that is frictionally driven by press-contact with the vibrator and configured to transmit rotational forces by the frictional driving to the output shaft, wherein
the pressing portion, the second driven member, the third driven member, and the vibrator are arranged to allow an air flow generated by the airflow generation unit to flow through the air-ventilation path of the pressing portion, between the second driven member and the third driven member, and the air-ventilation path of the vibrator.

* * * * *